July 10, 1956
J. W. POLLARD
2,754,446
ARC LAMP CONTROL SYSTEM
Filed July 1, 1953
3 Sheets-Sheet 1
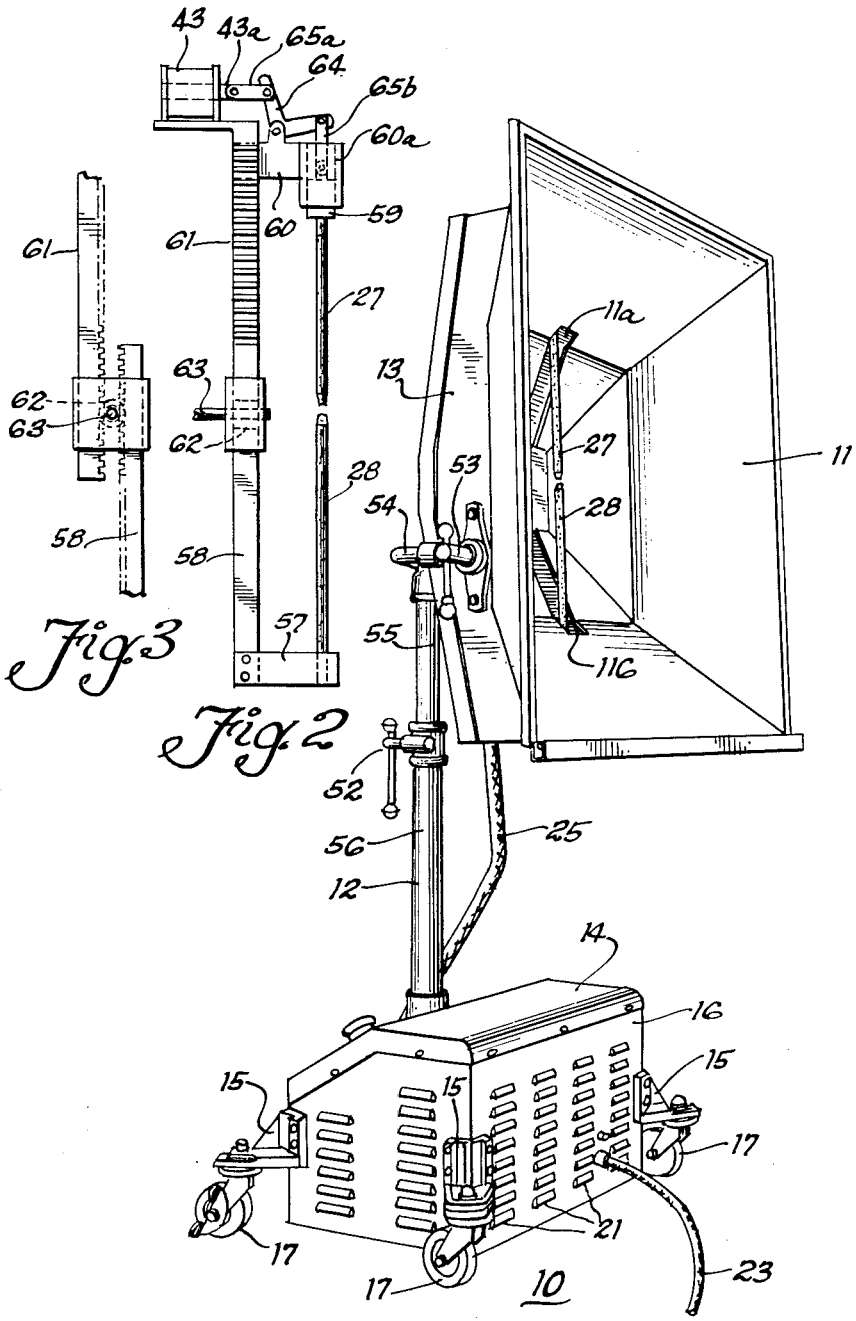
INVENTOR.
Joseph W. Pollard
BY Mason, Kolehmainen,
Rathburn & Wyss
Att'ys

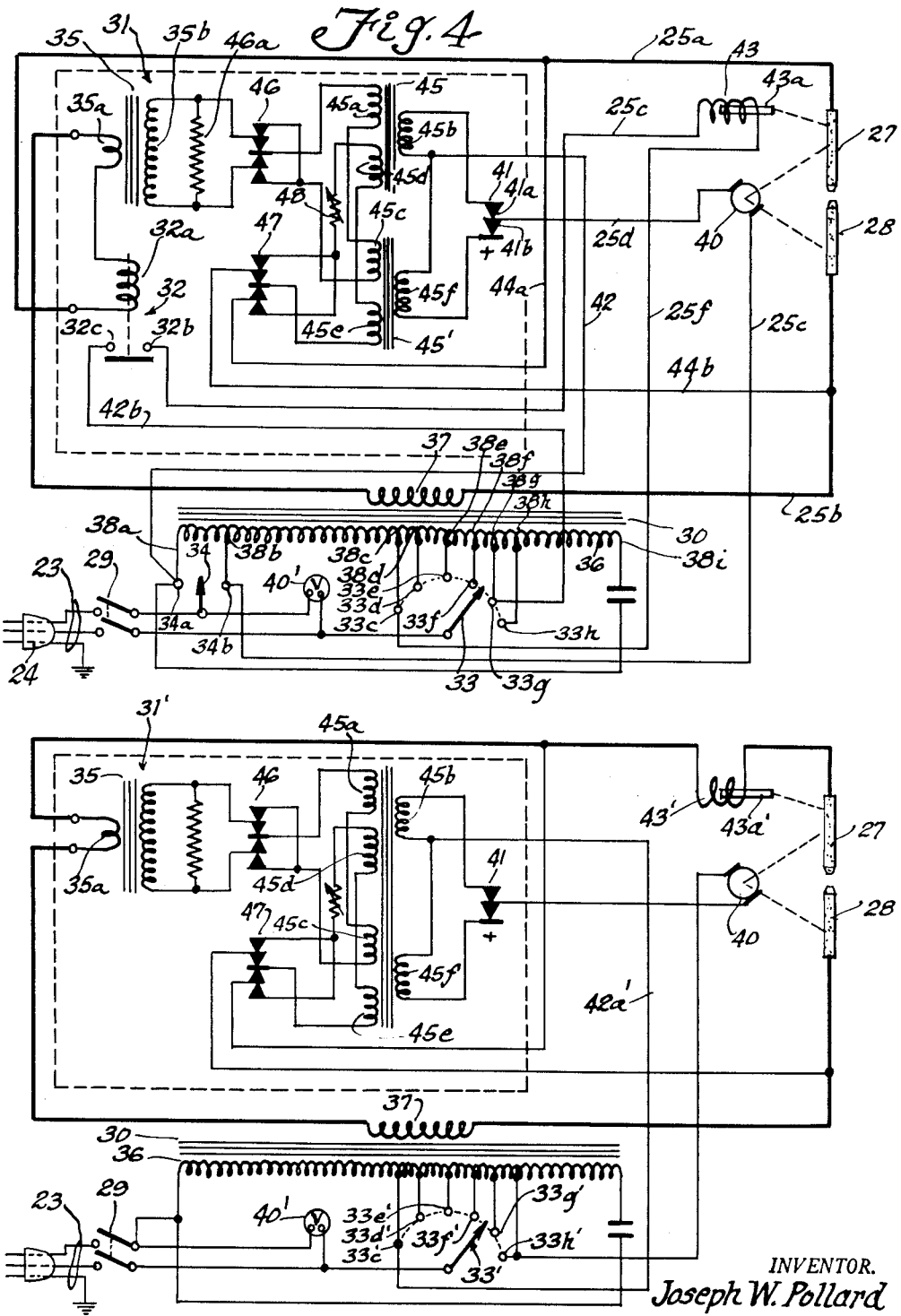

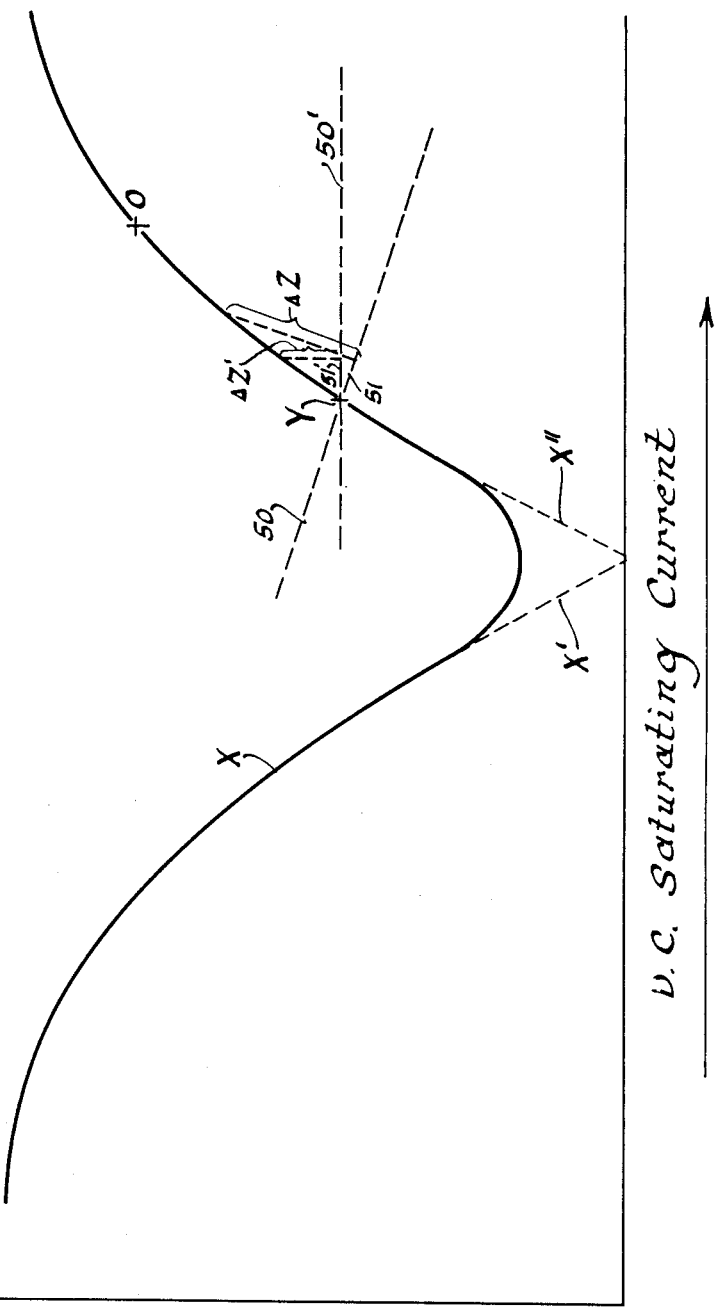

United States Patent Office 2,754,446
Patented July 10, 1956

2,754,446

ARC LAMP CONTROL SYSTEM

Joseph W. Pollard, Villa Park, Ill., assignor, by mesne assignments, to Nu Arc Co., Inc., Chicago, Ill., a corporation of Illinois Application July 1, 1953, Serial No. 365,319

14 Claims. (Cl. 314—65)

The present invention relates generally to arc lamps and more particularly to an arc lamp having a long, fault-free life which is especially adapted for use in the graphic arts industry where an accurately controlled light source of a constant predetermined intensity is desired.

More specifically, the present invention is an improvement on the arc lamp described and claimed in United States Letters Patent 2,616,059 to Harold R. Benson and assigned to the same assignee as the present invention. This patent discloses an arc lamp for providing constant illumination under varying conditions by maintaining a uniform current flow through the arc. The arc current of the lamp described by Benson was accurately maintained at a constant value despite variations in supply voltage and regardless of impurities in the carbons forming the electrodes of the arc lamp. The control over the arc current was attained by providing a means for striking the arc and control means for varying the spacing between the electrodes by simultaneously moving the electrodes in a substantially straight line pathway to compensate for variations in circuit conditions. The control means included means responsive to current flowing through the arc for controlling motive means to maintain a uniform gap between the electrodes. By maintaining the current flow through the gap constant regardless of the burning rate of the carbons, the same light intensity may be achieved and an accurately controlled light source is provided.

It is an object of the present invention to provide an improved arc lamp for use in the graphic arts industry in which the intensity of the light is controlled by a system which is sturdy, fool-proof and relatively free of operating failures.

Another object of the invention is to provide an arc lamp control system in which the component parts are not susceptible to failure as a result of the high current flow inherent in arc lamp circuits.

A further object is to provide an arc lamp control system in which a small change in arc current may be used to control accurately the spacing between the electrodes producing the arc.

A still further object of the present invention is to provide an improved arc lamp control system which is more efficient in controlling the light intensity of the arc and which has a longer operating life than prior art arrangements.

Another object of the invention is to provide an arc lamp control system for maintaining a predetermined spacing between electrodes in which a variable impedance is placed in series with an electric motor to control the current flow to the motor thereby regulating its speed.

Still another object of the invention is to provide an arc lamp in which the intensity of the light emanating from the arc is maintained constant by a control system utilizing a magnetic amplifier which is responsive to minute deviations in arc current.

Further objects and advantages of the present invention will become apparent as the following description proceeds, and the features of novelty which characterize the invention will be pointed out with particularity in the claims annexed to and forming a part of this specification.

For a better understanding of the present invention reference may be had to the accompanying drawings in which:

Fig. 1 is a perspective view of an arc lamp embodying the present invention;

Fig. 2 shows a portion of the control mechanism for moving the electrodes of the arc lamp shown in Fig. 1;

Fig. 3 is a broken-away view showing a portion of the mechanism of Fig. 2 as viewed from the rear of the arc lamp with the mechanism housing removed;

Fig. 4 illustrates a schematic diagram of one embodiment of the electrical control system for the electrode moving mechanism of the present invention;

Fig. 5 is a schematic diagram of an electrical control system which is a second embodiment of the present invention; and Fig. 6 is a curve diagram to aid in understanding the operation of the present invention.

In accordance with the present invention the foregoing and other objects are realized by an arc lamp which provides constant illumination under varying conditions by maintaining a constant current flow through the arc irrespective of voltage variations in the source and regardless of non-uniformity in the carbons constituting the electrodes of the lamp. There is provided an arc striking means and a mechanism and control means for simultaneously moving the carbons in a substantially straight-line path to insure an arc of uniform illumination intensity. Transformer means are included to provide a high arc current with power factor correction means to assure a minimum power consumption. The carbons are fed automatically to maintain a uniform gap by a motor feed which maintains the carbons a predetermined distance apart regardless of their burning rate, thereby insuring exactly the same amount of light for each energization of the lamp. The speed of the motor feed is controlled by the control means which includes a variable impedance in series with a source of potential and with the motor whereby a variation in the arc current causes a change in the variable impedance to alter the motor speed and correct for the change in current.

The variable impedance is in the form of a sensitive magnetic amplifier which is responsive to minute variations in arc current thereby applying a correcting signal to the motor feed as soon as the arc current tends to deviate from a constant preselected value. In this manner a substantially constant arc current is provided and a uniform gap is maintained between the electrodes to insure that the requisite light intensity is maintained.

Referring now to the drawings and particularly to Fig. 1 thereof, there is illustrated the improved arc lamp 10 of the present invention which comprises a suitable reflector 11 specifically illustrated as having a rectangular cross section and being constructed in the form of a truncated pyramid. The arc lamp 10 further includes a main supporting post 12 on which the reflector 11 and associated control mechanism disposed within a suitable housing defined by a cover member 13 is mounted as described in greater detail hereinafter. The post 12 extends upward through the center of a suitable cover 14 of a housing 16 which encloses an electrical power and control unit for the arc lamp 10. Each corner of the housing 16 is provided with a support arm 15 on which is mounted a suitable caster 17 to increase the mobility of the arc lamp by permitting it to be moved with facility to any desired position. The housing 16 is provided with suitable louvers 21 whereby cooling air may circulate therethrough to prevent the power unit contained within the housing from reaching inordinately high temperatures. A suitable power cord 23 is connected to the means disposed within the housing 16 to supply the electrical units contained therein with electrical energy from a source not shown. Preferably, the conductor 23 is adapted to be connected to an alternating current source having a potential of 220 volts although it will be obvious from the ensuing description that the particular magnitude of voltage may vary over a wide range, and means are provided to compensate for such voltage variations. A control cable 25 supplies the necessary current for the arc as well as control current for the controlling means associated with the electrodes designated by the reference numerals 27 and 28 in the drawings.

In order to obtain an overall picture of the electrical circuit for the arc lamp of the present invention and before discussing various details of the lamp, reference may be had to Fig. 4 of the drawings wherein the electrical circuit for the arc lamp is illustrated and which furthermore schematically illustrates a number of important features of the present invention. As there illustrated, the power cord 23 is connected to a suitable alternating current power plug 24 and to an on-off control switch 29 which controls the application of power to the power control unit disposed within the housing 16. The power control unit comprises essentially a transformer 30, a magnetic amplifier 31, a strike control relay 32 and fine and coarse tap changing switches 33 and 34, respectively.

The transformer 30 comprises a tapped primary winding 36 and a secondary winding 37, the primary winding being provided with a plurality of taps designated by the reference numerals 38a, 38b, 38c, 38d, 38e, 38f, 38g, 38h and 38i. The taps 38a and 38b are respectively connected to the contacts 34a and 34b of the coarse adjustment tap changing switch 34 while the taps 38c, 38d, 38e, 38f, 38g and 38h are connected respectively to the taps 33c, 33d, 33e, 33f, 33g, and 33h of the fine adjustment tap changing switch 33. These tap changing arrangements are provided to enable the arc lamp to produce a constant light intensity irrespective of input voltage conditions and it is therefore necessary to provide the primary transformer winding 36 with suitable taps to accommodate the various voltages with which the unit might be supplied. So that the proper settings of the tap changing switches 33 and 34 may be determined, there is provided a volt meter 40' connected directly across the power source in order to measure the voltage supplied to the power control unit by the conductor 23. The power switch 29, the tap changing switches 33 and 34 and the volt meter 40' are mounted on the cover 14 of the housing 16 to provide a readily accessible control over the voltage energization to the arc lamp 10.

Although a particular voltage might nominally be termed a 220 volt source, it is well known that the voltage from such a source might vary over a substantial range which, for example, might be the range of 200 to 252 volts. The tap 34a and the tap changing switch 34 is preferably employed for source voltages within the range of 225 to 252 volts so as to place an increased number of effective turns in the primary of the transformer 30 thereby tending to decrease the voltage appearing across the secondary 37 of the transformer.

The effect of increasing the primary turns simultaneously with an increased primary voltage is to maintain the voltage appearing across the secondary 37 of the power transformer at a constant value. The tap 34b of the tap changing switch 34 is primarily used for voltages within the range of 200 to 225 volts and when the arm of the switch 34 contacts the tap 34b, the number of effective turns of the primary 36 of the transformer 30 is reduced. The reduction of the number of effective primary turns simultaneously with a decreased input voltage causes the output voltage appearing across the secondary 37 of the transformer to be maintained at a constant value. The tap changing switch 33 is capable of adjusting for small voltage increments within the two ranges of the tap changing switch 34 so that regardless of the value of the input voltage from the source within the range there will appear across the secondary winding 37 of the transformer 30 a voltage which is always the same except for minor fluctuations of the voltage source.

The secondary winding 37 of the power transformer 30 is connected to the carbon electrodes 27 and 28 through power conductors 25a and 25b contained in the cable 25. In this high current circuit, which for a particular embodiment constructed in accordance with the present invention produced a current flow of 50 amperes, there are serially connected the winding 32a of the strike control relay 32 and a signal input winding 35a which comprises the primary winding of a signal input current transformer 35 for the magnetic amplifier 31.

For the purpose of maintaining constant the current flow through the carbon electrodes 27 and 28, which is a function of the arc gap between these electrodes, there is provided an electric motor generally designated as 40 and suitably connected by a driving mechanism, schematically indicated by dashed lines in Fig. 4, with the respective electrodes 27 and 28 so that these electrodes are simultaneously moved toward each other upon rotation of the motor 40. The motor 40 is illustrated as of conventional type and need not be a reversible motor as commonly used in prior art arrangements, since it has been found that once the arc is struck and the current flow reaches a predetermined level, the only required movement of the electrodes will be to compensate for the consumption of the carbons and this may be accomplished by providing unidirectional movement of the electrodes toward each other. Although a control circuit could be designed to permit the use of a reversible motor if desired, it has been found that automatically controlled movement of the electrodes away from each other is a needless refinement and in the present invention has been eliminated. The motor 40 may, therefore, be of any suitable type, either unidirectional or reversible, but preferably a series wound D. C. motor which is like a universal motor in that it will also run on A. C. or, alternatively, a brushless induction motor is employed. One side of the motor winding 40 is connected through conductor 25c which is included within the cable 25 to the tap 34b of the tap changing switch 34 whereas the other side of this winding is connected through conductor 25d also included in the cable 25 to the output of the magnetic amplifier through a dual connected dry rectifier 41. The upper rectifier 41a of the dual rectifier is connected to one side of the A. C. output winding 45b of a saturable core reactor 45 whereas the lower rectifier 41b is connected to one side of an A. C. output winding 45f of a saturable core reactor 45'. The saturable core reactors 45 and 45' may be of any well known design such as of three-legged or four-legged construction, the particular type of reactor selected being inconsequential insofar as the present invention is concerned. The other side of the output winding 45b is connected through a conductor 42 positioned in the power control unit to the tap 34a on the tap changing switch 34.

The taps 34a and 34b are in turn connected to a portion of the primary 36 of the transformer 30 thereby providing a control voltage which is a fractional part of the input supply voltage and which is connected in series circuit with the winding of the motor 40 and with the output of the magnetic amplifier 31. Hence, it is apparent that when the power control switch 29 is closed, the input source applies a substantially constant potential across the winding of the motor 40 and the impedance of the magnetic amplifier which are in series, whereby an increase in the impedance of the amplifier results in a decrease in the current flowing in the series circuit. Manifestly, if the impedance is varied in accordance with changes in arc current, a control means is provided for varying the current flow to the motor 40 which may be utilized to alter the spacing between the electrodes and reestablish the arc current to its proper level.

When an arc has been struck by the energization of the strike control relay 32, the operation of which will become apparent as the description proceeds, current flow between the electrodes 27 and 28 passes through the winding 32a of the strike control relay 32 and through the input winding 35a of the magnetic amplifier which are connected in series with the arc and with the transformer secondary 37. Normally, when the arc lamp is de-energized, the carbon electrodes are positioned so that their ends abut and are movable in a straight line direction toward or away from each other. When the control switch 29 is activated, the current flow between the electrodes which passes through the winding 32a of the strike control relay 32 energizes the relay and establishes electrical contact between contacts 32b and 32c. The contact 32b is connected to one side of a striking solenoid 43 through the conductor 25e which is included within the power control cable 25. The contact 32c is connected through a conductor 42b, housed within the power control unit, to the tap 33g of the tap changing switch 33. The other side of the strike control solenoid 43 is connected through conductor 25f included within the power cable 25 to the tap 33c of the tap changing switch 33. The taps 33c and 33g are connected across a portion of the primary 36 of the input power transformer 30 thereby applying a source of potential directly across the solenoid 43 when the arc strike relay is closed and the contacts 32b and 32c are interconnected. The energization of the striking solenoid motivates solenoid armature 43a which is mechanically connected by a mechanism, schematically indicated by the dashed line in Fig. 4, to the upper electrode 27 thereby causing the upper electrode to move away from the lower electrode and establish an arc between the two. When the electrodes are moved apart a sufficient distance to establish an arc having a current flow of predetermined magnitude, the magnetic amplifier 31 will attain sufficient impedance to reduce the current flow to the motor 40 and maintain the motor in a de-energized condition as will become evident as the description proceeds.

As the carbon electrodes 27 and 28 are consumed, the arc length will tend to increase and the current flow between the electrodes will tend to decrease. The decreased current flow will be applied as an input signal to the primary winding 35a of the signal input transformer 35 of the magnetic amplifier 31, the secondary 35b of which is connected across suitable terminals of a bridge type rectifier 46 which converts the A. C. signal from the current transformer to a D. C. control signal to be applied simultaneously to D. C. control windings 45a and 45c of the saturable core reactors 45 and 45', respectively. A load resistor 46a is connected across the output terminals of the secondary 35b of the current transformer 35 to prevent phase shift in the transformer which might otherwise occur under no load conditions.

To provide bias for the magnetic amplifier the voltage drop across the arc is applied directly through the conductors 44a and 44b, contained within the power control unit, to opposite terminals of a bridge type rectifier 47 which transforms the A. C. variations due to voltage across the arc into a D. C. bias control for application to the bias windings 45d and 45e of the saturable core reactors 45 and 45', respectively. In series circuit with the output terminals of the rectifiers and with the bias windings of the reactors is an amplitude adjusting potentiometer 48 which serves to adjust the bias of the saturable core reactors and, consequently, of the magnetic amplifier 31 to a predetermined value for proper operation of the magnetic amplifier in accordance with the magnitude of the arc current to be controlled. The initial bias value is determined by a proper selection of the number of energizing turns of the primary 36 of the transformer 30 which provides a coarse bias setting and the adjusting potentiometer 48 provides a fine control over the coarse value thus established. If desired, the input signal for the magnetic amplifier may be developed across the strike control relay 32 in which case the input windings 35a would be connected in parallel with the winding 32a of the relay instead of being connected in series therewith as heretofore described.

The current through the motor 40 passing through the rectifier 41 develops a D. C. voltage which is supplied to the saturable core reactors providing an initial magnetic bias. This bias varies with the current through the motor in such a direction to aid the forces produced by the bias windings thereby to provide regenerative feed back for the magnetic amplifier and hence increase its gain. The rectifier 41 converts the A. C. output signal to a D. C. signal which is of a polarity to aid the D. C. bias voltage applied to the saturable core reactors 45 and 45'.

From the foregoing it is apparent that the magnetic amplifier shown in Fig. 4 is essentially a balance type magnetic amplifier which is biased to introduce an initial D. C. saturation to the saturable core reactors 45 and 45' thereby enabling the amplifier to be operated by the application of a small input signal, since the gain of the amplifier may be increased by adjusting the bias until the amplifier operates in a high amplification region of its characteristic curve. As soon as the arc current has reached its preselected level, the bias and control signal to the amplifier are such that the amplifier impedance is relatively high and the current flow to the motor is very low whereby the motor is cut off and the electrodes are maintained in a position to develop the preselected current flow. When the arc current tends to decrease, control current from the current transformer 35 passing through the D. C. control windings 45a and 45c is decreased, the bias turns on the saturable core reactors 45 or 45' are aided by the ampere turns from the output winding whereas the ampere turns established by the D. C. control signal on the saturable core reactors are opposed by the ampere turns due to the bias winding. Thus the saturable core reactors decrease in impedance upon the application of a decreased current derived signal. The decreased reactances of the A. C. coils 45b and 45f results in a net change in impedance of the amplifier thereby altering the flow of current to the motor 40 in proportion to the magnitude of the input signal. The first result of a decreased arc current due to the change in electrode spacing is a direct increase in bias on the amplifier and simultaneously therewith a decreased control signal is applied to the saturable core reactors, the net effect of which is to cause an almost instantaneous decrease in magnetic amplifier impedance. The decreased impedance results in an increased current flow to the motor and the electrodes are moved together until the change in spacing has been corrected. As the electrodes move together, the voltage drop across the arc decreases, the control signal decreases and the high impedance value of the amplifier is restored to effectively cut off the motor and prevent excessive movement of the electrodes toward each other. The rectifier 41 in the output of the magnetic amplifier causes a control voltage to be fed back to the reactors which aids the D. C. control signal in order to provide more effective response to low magnitude control signals.

In the embodiment of the invention constructed in accordance with the schematic diagram of Fig. 4 an arc current of 50 amperes is desired and it is the purpose of the present invention to maintain this current at an approximately constant value in order to provide constant illumination from the light source of the arc. From the preceding description it can be seen that any slight deviation from the 50 ampere value causes a D. C. control signal to be applied to the D. C. control windings of the saturable core reactors and, simultaneously therewith, applies a changing D. C. bias value to the bias windings of the saturable core reactors in accordance with variations in the voltage drop across the arc. Since the voltage drop across the arc is inversely proportional to the current therethrough, it becomes apparent that the effect of the bias variation is to cooperate with the variations in input signal to provide a double correction to the magnetic amplifier and cause the impedance of the amplifier to vary accordingly. As the arc current tends to decrease, the effect of the bias windings and control windings in cooperation with the regenerative feed back is to cause the impedance of the magnetic amplifier to drop since the output of the amplifier is connected in series with the motor across a source of potential appearing across the taps 34a and 34b of the tap changing switch 34. This drop in impedance increases the current flow to the motor, causes the motor to rotate at an increased speed, moves the electrodes 27 and 28 toward each other and thereby induces an increase in the arc current to counteract the tendency of the arc current to decrease. Therefore, the consuming of the carbons of the electrodes by the use of the arc lamp is fully compensated by the magnetic amplifier 31 and the motor 40 and its associated driving mechanism which maintain the arc at a substantially constant current value.

In the embodiment of Fig. 4 the control of the arc spacing was provided by a circuit in which a separate relay was connected in series with the arc current flow in order to provide an initial means for striking the arc and actuating the striking solenoid. In the embodiment shown in Fig. 5 the striking solenoid has been connected directly in series with the input winding for the magnetic amplifier and, accordingly, the use of a separate strike control relay has been obviated. The elimination of the strike control relay also permits simplification of the input circuit for the energizing power of the arc lamp by dispensing with one of the tap changing switches. Preferably, the embodiment of Fig. 5 includes the control switch 29 which applies power from an A. C. source through the input power conductors 23 to one side of the primary 36 of the power transformer 30 and to the center arm of the tap changing switch 33' which may be used to adjust the energizing voltage appearing across the secondary 37 of the transformer 30 in the manner heretofore described. The volt meter 40' is connected directly across the input power conductors 23 to enable the operator to ascertain the correct setting of the tap changing switch 33' upon varying voltage input values. The tap changing switch 33' is provided with taps 33c', 33d', 33e', 33f', 33g' and 33h' which are connected directly to portions of the primary winding 36 of the transformer 30. One side of the motor 40, which controls the movements of the electrodes 27 and 28 through driving mechanism schematically represented by the dashed lines of Fig. 5, is connected to the tap 33h' of the tap changing switch 33'. The other side of the winding of the motor 40 is connected through the output rectifier 41 to the output windings 45b and 45f of the magnetic amplifier 31. The junction point of the windings 45b and 45f is connected through a conductor 42a' to the tap 33c' of the tap changing switch 33', whereby the potential appearing between the taps 33c' and 33h' is encircuited in series connection with the motor 40 and the output of the magnetic amplifier 31' in a manner similar to the connection of the embodiment described in Fig. 4. As in the embodiment of Fig. 4 the carbon electrodes 27 and 28 are normally positioned in abutment when the arc lamp is in a de-energized condition so that upon energization of the lamp by closing the power control switch 29, current flows from the secondary 37 of the transformer 30 through the electrodes, through the winding 43' of the solenoid and through the input winding 35a of the magnetic amplifier 31'. The arc current flow through the solenoid winding moves the solenoid armature 43a' and the connecting mechanism, represented schematically by dashed lines, to move the upper electrode away from the lower electrode and draw an arc. The operation of the magnetic amplifier 31' is identical with that of the magnetic amplifier 31 described in the embodiment shown in Fig. 4, in that the establishment of an arc of predetermined current magnitude causes the impedance of the amplifier to reach a value which will be sufficient to maintain the spacing between the electrodes at a uniform distance. As the carbons of the electrodes are consumed, the arc current tends to decrease since the spacing between the electrodes is increased and, consequently, this decreased signal is applied through the current transformer 35 and the bridge rectifier 46 to the D. C. control windings 45a and 45c of the saturable core reactors. Simultaneously therewith the increased voltage drop across the arc resulting from a decrease in the arc current causes the bias, which is developed across the bridge rectifier 47 and applied to the bias windings 45d and 45e of the saturable core reactors, to vary in a direction to aid the unbalance in the magnetic amplifier and decrease its impedance. The decreased impedance of the magnetic amplifier results in a higher current flow to the motor 40 from the source of potential appearing between the taps 33c' and 33h' inducing an increased speed of rotation of the motor to compensate for the change in arc length.

The operation of the magnetic amplifiers described in the embodiments of Figs. 4 and 5 will best be appreciated by reference to the graph shown in Fig. 6 in which the D. C. saturating current applied to the magnetic amplifier is plotted as the abscissa of the curve and the impedance of the magnetic amplifier and the current flow to the motor are simultaneously plotted as ordinates to this curve, the two ordinate parameters obviously being represented by different scale values. As shown in Fig. 6, the magnetic amplifier impedance is plotted in a positive direction from the origin of the curve so that minimum impedance is encountered at the lowest point on the curve, whereas current flow is plotted in an opposite direction so that maximum current is realized at this lowest point. The point 0 shown on the graph represents the initial D. C. bias value established by the voltage drop across the arc and serves as the operating point for the magnetic amplifier. The solid line curve X represents a plot of either the impedance of the magnetic amplifier or the current flow to the motor 40 as the D. C. saturating signal varies, graphically illustrating that these quantities vary inversely. The dotted line extensions X' and X" of this curve X indicate that the two curve portions would intersect at a point on the base line of the curve when the impedance of the magnetic amplifier would be zero in value if the A. C. windings of the saturable core reactor did not include some D. C. resistance. However, the D. C. resistance of the windings prevents the curve from reaching a zero value and hence the curve shape will approximate that which is shown. The operating point for the curve, which represents the impedance and current flow when the arc current is at the desired level, is established at a position of relatively high magnetic amplifier impedance by adjusting the bias in the manner heretofore described. The decreased arc current resulting from a burning of the carbons causes the saturating current to drop due to the increased bias and to the decreased input signal and, consequently, the impedance drops until the point Y is reached on the curve, at which time the electrodes have been moved sufficiently close together to cause an increased input signal and a decreased bias. The effect of the regenerative feed back may be diagrammatically illustrated by tilting the axis of the operating load line for the curve as represented by the numeral 50 in Fig. 6. With the line 50 as a load line, the change in arc current value due to the consumption of the carbon electrodes results in a D. C. signal which combines with the bias signal changes due to the increased voltage drop across the arc and may be represented by an effective signal generally indicated by the line 51. It is apparent that this small signal change results in an appreciable variation of the impedance of the magnetic amplifier as represented by the quantity $\Delta Z$, which variation enables the motor 40 to be responsive to minute deviations in arc current. If the feedback circuit were eliminated, the load line would be represented by the line 50' parallel to the base line of the curve, and, consequently, a small signal change 51' equal in magnitude to the signal 51 results in an impedance change $\Delta Z'$ which is considerably smaller than the quantity $\Delta Z$. Therefore, it is manifest that the use of regenerative feed back increases the effectiveness of the signal due to the fact that a large variation in impedance results from a small change in effective signal. The main disadvantage of the regenerative feed back circuit is a tendency of the amplifier to be unstable or to oscillate at high input signals, but by correcting the arc current changes before a high amplitude signal is developed, the magnetic amplifier employed in the present invention avoids this difficulty. The stability, of course, could be increased by operating the amplifier degeneratively, that is, by feeding back a signal which would oppose the D. C. control signal resulting from the change in arc current. However, the resulting increased stability would be achieved only at the expense of a decrease in amplifier gain and, accordingly, small signal changes in the arc current would not be effective to vary the impedance of the amplifier.

Referring now to Fig. 1 for a more complete description of the structure of the arc lamp, it can be seen that the reflector 11 and the carbon electrode control mechanism contained within the housing 13 is supported upon the post 12 by a supporting frame which includes a bifurcated support member 54 attached to the upper end of the post and to the housing 13. The post 12 includes an upper post 55 which is telescopically slidable within a lower post 56 of somewhat larger diameter than the upper section. To provide a means for adjusting the vertical height of the reflector 11, the upper and lower posts 55 and 56 are operatively interconnected by a clamping member 52 which enables the upper post to be adjustably clamped at any preselected height with respect to the fixedly positioned lower post 56.

In order to permit a pivoting of the reflector 11 about a horizontal axis in a controlled manner, there are provided clamping members 53 which interconnect the bifurcated support frame 54 and the housing 13. For a detailed description of the operation of the vertical and horizontal positioning adjustments for the reflector 11, reference may be had to the aforementioned patent to Benson.

For a brief description of the electrode control mechanism which is disposed within the housing 13, attention is directed to Figs. 2 and 3 in which the electrodes 27 and 28 are shown in position mounted for reciprocal movement. The lower electrode 28 is mounted on an electrode holder 57 which is secured to a rack 58. The upper electrode 27 is mounted on an upper electrode carriage 60 attached to a rack 61, which carriage includes a movable electrode holding collar 59 slidable within an annular bushing 60a. The two racks 58 and 61 are mounted parallel to each other within the housing 13 and are interconnected by a gear driving mechanism 62 which is mounted on driving shaft 63 of the motor 40. In order to cause linear movement of the carbon electrodes 27 and 28, the gear mechanism 62 may be rotated to induce movement of the parallel racks 58 and 61 to simultaneously move the electrodes toward or away from each other. Thus for one direction of rotation of the gear 62 the carbon carriages 57 and 60 will move toward each other to move the electrodes together and for a reverse rotation of the gear 62 the carriages will move apart. For the purpose of permitting manual rotation of the gear 62 without interfering with the operation of the motor 40, a suitable friction clutch may be provided. The manual rotating mechanism may be utilized to separate the carriages 57 and 60 in order to insert new carbon electrodes in the arc lamp whenever necessary. Hence, the gear mechanism 62 is generally rotated in one direction by the manual rotating mechanism to separate the electrodes and the motor 40 is operative to rotate the gear mechanism in the reverse direction to move the electrodes toward each other. The operation of the moving mechanism for the electrodes and of the manual control and gear mechanism is explained in detail in the aforementioned Benson patent.

For the purposes of the present invention it is sufficient to point out that the carbon electrodes 27 and 28 extend through suitable openings 11a and 11b in the reflector so as to permit an arc to be drawn approximately at a central focus point of the reflector. The openings 11a and 11b are preferably large enough so that a portion of the carbon carriages 57 and 60 may be accommodated to permit the utilization of a maximum amount of the carbons.

Secured to the upper end of the rack 61 is the arc striking solenoid 43 which is capable of causing high speed separation of the carbon electrodes 27 and 28 independently of the action of the motor 40 and of the manual control mechanism in order to draw an arc initially. To this end it is desirable that the carbon electrodes contact each other when the arc lamp is de-energized and no current flows between the electrodes. To provide for the high speed operation of the electrodes, the upper carbon 27 is reciprocally movable within the annular bushing 60a which closely engages the carbon holder 59 and restricts the movement of the carbon holder and the upper electrode to a substantially straight line path. To provide for the reciprocal movement of the upper electrode the bell crank 64 which is mounted on the upper electrode carriage 60 interconnects the armature 43a of the solenoid 43 and the upper electrode holder 59 by means of suitable linkage 65a and 65b. Energization of the solenoid 43 induces movement of its armature 43a to rotate the bell crank 64 through the linkage 65a. The bell crank 64 transfers the movement of the solenoid armature to the upper electrode holder 59 and consequently when the solenoid is energized, the holder 59 moves upwardly as viewed in Fig. 2 within the annular bushing 60a to cause a relative separation between the carbons 27 and 28. When the solenoid 43 is de-energized, the upper carbon electrode 27 is moved downwardly by the force of gravity due to the weight of the holder 59 supplemented by a suitable spring or the like to rotate the bell crank in clockwise direction as viewed in Fig. 2 and move the solenoid armature 43a to the right as viewed in that figure. As soon as current flows through the carbon electrodes 27 and 28 upon closing of the power control switch 29, the solenoid 43 is energized to separate the electrodes and draw an arc therebetween. The lower carbon 28 is positioned so that arc is drawn at approximately the center of the reflector and, since both of the electrodes will be consumed in approximately equal amounts, the movement of the parallel racks 58 and 61 by the motor 40 at substantially the same rate will maintain the arc at approximately the center of the reflector.

In view of the detailed description included above, the operation of the present invention will readily be understood by those skilled in the art. The reflector 11 is initially adjusted to the desired vertical height and to the correct reflecting angle by proper manipulation of the manually adjustable clamps 52 and 53. As mentioned heretofore, the electrodes 27 and 28 are normally positioned so that their ends are in physical contact before the arc lamp is energized. Upon the actuation of the switch 29 the volt meter 40' indicates the voltage from the source and the tap changing switches 33 and 34, or 33' depending upon the particular embodiment of the invention employed, are adjusted for the proper range of voltage to assure a uniform arc temperature and consequently uniform illumination under varying voltage supplies from the source. When the switch 29 is closed, current flows through the electrodes and operates the solenoid either through the arc strike control relay 32 or by current directly flowing through the solenoid winding, depending again on the embodiment selected. The solenoid separates the electrodes to draw an arc therebetween by moving the upper carbon 27 upwardly to the limit of movement of the solenoid armature. The solenoid will remain energized as long as current continues to flow between the electrodes. The magnetic amplifier 31 will very accurately maintain at a constant value the current flowing through the arc in order to operate the motor 40 in accordance with the changes in arc current. The arc current will remain constant irrespective of voltage changes of the power source and regardless of the impurities inherently incorporated within the carbon electrodes which cause these carbons to have hard or soft spots to affect the burning rate of the electrodes. Since the initial arc current is accurately controlled with respect to the initial voltage conditions from the source by means of the tap changing switches and since the magnetic amplifier control operates to maintain the arc current at its predetermined value, the same Kelvin temperature of the arc can be achieved for all circuit conditions and hence a constant source of illumination is provided.

It is apparent that the arc lamp control system of the present invention has eliminated the use of fragile electrical components which are susceptible to deterioration due to the high current values resulting from the arc source. Therefore an arc lamp which is substantially free of maintenance problems, which is rugged in operation and which will have a long operating life has been provided. The sensitivity of the magnetic amplifier will permit the control system to respond to very small changes in arc current and consequently a very accurate light source is available.

While there have been illustrated and described several embodiments of the present invention, it is not desired that the invention be limited to the constructions shown and described, for it will, of course, be obvious to those skilled in the art that changes and modifications may be made without departing from the invention in its broader aspects, and it is therefore the purpose of the appended claims to cover all such changes and modifications as fall within the true spirit and scope of this invention.

What is claimed as new and desired to be secured by Letters Patent of the United States is:

1. In an arc lamp comprising a pair of electrodes between which an arc is adapted to be drawn, the combination of a holder for supporting each of the electrodes, means including an electric motor for moving said holders to control the arc space between the electrodes, an electrical circuit including a source of potential and a variable impedance in series with said motor, and means responsive to the current flowing through said arc for varying the impedance of said variable impedance to control the current flow from the source of potential to the motor thereby causing the moving means to maintain a predetermined arc space between said electrodes.

2. In an arc lamp comprising a pair of electrodes between which an arc is adapted to be drawn, the combination of a holder for supporting each of the electrodes, means including an electric motor for moving said holders to control the arc space between the electrodes, an electrical circuit including a source of potential and a variable impedance in series with said motor, amplifying means including said variable impedance and responsive to the current flowing through said arc for varying said impedance to control flow of current from the source of potential to the motor thereby causing the moving means to maintain a predetermined arc space between said electrodes.

3. In an arc lamp comprising a pair of electrodes between which an arc is adapted to be drawn, the combination of a pair of holders for supporting said electrodes, means including an electric motor for moving said holders to control the arc space between the electrodes, an electrical circuit including a source of potential and a saturable reactor in series with said motor, and means responsive to the current flowing through said arc for varying the impedance of said saturable reactor to control the current flow from the source of potential to the motor thereby enabling the moving means to maintain a predetermined arc space between said electrodes.

4. In an arc lamp comprising a pair of electrodes between which an arc is adapted to be drawn, the combination of a pair of holders for supporting said electrodes, means including an electric motor for moving said holders to control the arc space between the electrodes, an electrical circuit including a source of potential and a saturable reactor in series with said motor, and a magnetic amplifier including said saturable reactor and responsive to the current flowing through said arc for varying the impedance of said saturable reactor to control the current flow from the source of potential to the motor thereby enabling the moving means to maintain a predetermined arc space between said electrodes.

5. In an arc lamp comprising a pair of electrodes between which an arc is adapted to be drawn, the combination of a holder for supporting each of the electrodes, means including an electric motor for moving said holders to control the arc space between the electrodes, an electrical circuit including a source of potential and a variable impedance in series with said motor, amplifying means including the variable impedance and responsive to the current flowing through said arc for varying said impedance to control the flow of current from the source of potential to the motor, and means responsive to the flow of current through the arc for biasing said amplifying means in order to provide additional control for the current flow to the motor thereby enabling the moving means to maintain a predetermined arc space between said electrodes.

6. In an arc lamp comprising a pair of electrodes between which an arc is adapted to be drawn, the combination of a pair of holders for supporting said electrodes, means including an electric motor for moving said holders to control the arc space between the electrodes, an electrical circuit including a source of potential and a saturable reactor in series with said motor, a magnetic amplifier including said saturable reactor and responsive to the current flowing through said arc for varying the impedance of said saturable reactor to control the flow of current from the source of potential to the motor, and means responsive to the flow of current through said arc for biasing the magnetic amplifier to provide effective control of the current flow to the motor thereby enabling the moving means to maintain a predetermined arc space between said electrodes.

7. In an arc lamp, the combination of a frame, upper and lower electrode carriages mounted for relative movement on said frame, means for supporting an electrode from each of said carriages in co-linear relationship, a first rack connected to said upper electrode carriage, a second rack connected to said lower electrode carriage, the longitudinal axes of said racks being disposed in parallel relationship, a gear for engaging both of said racks to cause simultaneous movement of said racks in opposite directions, motive means connected to said gear, an electric circuit including a source of potential and a variable impedance in series with said motive means to control the flow of current thereto, and means responsive to the flow of current between said electrodes for varying the impedance of said variable impedance to control the flow of current to said motive means thereby maintaining a predetermined arc space between said electrodes.

8. In an arc lamp comprising a pair of electrodes between which an arc is adapted to be drawn, the combination of a pair of holders for supporting said electrodes, means including an electric motor for moving said holders to control the arc space between the electrodes, an electrical circuit including a source of potential and a saturable reactor in series with said motor, a magnetic amplifier including said saturable reactor and responsive to the current flowing through said arc for varying the impedance of said saturable reactor to control the flow of current from the source of potential to the motor, means for feeding back a portion of the output of said magnetic amplifier to provide regenerative feedback for aiding the saturation of said saturable reactor controlling the current flow to the motor thereby enabling the moving means to maintain a predetermined arc space between said electrodes.

9. In an arc lamp, the combination of a frame, upper and lower electrode carriages mounted for relative movement on said frame, means for supporting an electrode from each of said carriages in co-linear relationship, a first rack connected to said upper electrode carriage, a second rack connected to said lower electrode carriage, the longitudinal axes of said racks being disposed to parallel relationship, a gear for engaging both of said racks to cause simultaneous movement of said racks in opposite directions, motive means connected to said gear, an electric circuit including a source of potential and a saturable reactor in series with said motive means to control the flow of current thereto, and a magnetic amplifier responsive to the flow of current between said electrodes for varying the impedance of said saturable reactor to control the flow of current to said motive means thereby maintaining a predetermined space between said electrodes, said magnetic amplifier including bias windings energized by the flow of current between the electrodes, control windings energized by the current between the electrodes and a feedback circuit for controlling the saturation of said saturable reactor.

10. In an arc lamp, the combination of a frame, upper and lower electrode carriages mounted for relative movement on said frame, means for supporting an electrode from each of said carriages in co-linear relationship, a first rack connected to said upper electrode carriage, a second rack connected to said lower electrode carriage, the longitudinal axes of said racks being disposed to parallel relationship, a gear for engaging both of said racks to cause simultaneous movement of said racks in opposite directions, motive means connected to said gear, an electric control circuit for said motive means including a source of alternating current and a balanced magnetic amplifier in series with said motive means to control the flow of current thereto, said magnetic amplifier including a pair of saturable reactors, control windings on said saturable reactors, means for rectifying the current flowing between the electrodes to provide a D. C. control signal for said control windings, bias windings on said saturable reactor, means for rectifying the current flow between electrodes to provide a D. C. saturating signal for said bias windings, feedback rectifiers providing a feedback signal for said amplifier and controlled windings on said reactors connected in series with the alternating current source and the motor so that the current output of the magnetic amplifier flows through the motor to control the speed therof and maintain a predetermined spacing between said electrodes.

11. In an arc lamp, the combination of a frame, upper and lower electrode carriages mounted for relative movement on said frame, means for supporting an electrode from each of said carriages in co-linear relationship, a first rack connected to said upper electrode carriage, a second rack connected to said lower electrode carriage, the longitudinal axes of said racks being disposed in spaced parallel relationship, a gear for engaging both of said racks to cause simultaneous movement of said racks in opposite directions, an electric motor connected to said gear, an electromagnet mounted on said first rack, a lever interconnecting the supporting means for the upper electrode and the electromagnet, means responsive to the current flow between the electrodes for energizing said electromagnet to move the upper electrode away from the lower electrode and draw an arc, said electric motor being controlled by an electrical control circuit which includes a balanced magnetic amplifier and a source of alternating current in series with said motor, said magnetic amplifier including a pair of saturable reactors, control windings on said saturable reactors responsive to the current flow through the arc, bias windings on said saturable reactor also responsive to the current flow through the arc, and controlled windings on said reactors connected in series with the alternating current source and the motor so that the current output of said magnetic amplifier flows through the motor to control the speed thereof and maintain a predetermined spacing between said electrodes.

12. In an arc lamp, the combination of a frame, upper and lower electrode carriages mounted for relative movement on said frame, means for supporting an electrode from each of said carriages in co-linear relationship, a first rack connected to said upper electrode carriage, a second rack connected to said lower electrode carriage, the longitudinal axes of said racks being disposed in spaced parallel relationship, a gear for engaging both of said racks to cause simultaneous movement of said racks in opposite directions, an electric motor connected to said gear, an electromagnet mounted on said first rack, a lever interconnecting the supporting means for the upper electrode and the electromagnet, means responsive to the current flow between the electrodes for energizing said electromagnet to move the upper electrode away from the lower electrode and draw an arc, said electric motor being controlled by an electrical control circuit which includes a balanced magnetic amplifier and a source of alternating current in series with said motor, said magnetic amplifier including a pair of saturable reactors, control windings on said saturable reactors, means for rectifying the output of the secondary of said transformer to provide a D. C. control signal for said control windings, bias windings on said saturable reactor, means for rectifying the arc current flow between said electrodes to provide a D. C. saturating signal for said bias windings, feedback rectifiers providing regenerative feedback for said amplifier, and controlled windings on said reactors connected in series with the alternating current source and the motor so that the current output of said magnetic amplifier flows through the motor to control the speed thereof and maintain a predetermined spacing between said electrodes.

13. In an arc lamp, the combination of a frame, upper and lower electrode carriages mounted for relative movement on said frame, means for supporting an electrode from each of said carriages in co-linear relationship, a first rack connected to said upper electrode carriage, a second rack connected to said lower electrode carriage, the longitudinal axes of said racks being disposed in spaced parallel relationship, a gear for engaging both of said racks to cause simultaneous movement of said racks in opposite directions, an electric motor connected to said gear, an electromagnet mounted on said first rack, a lever interconnecting the supporting means for the upper electrode and the electromagnet, a relay energized by the current flow between said electrodes, a series electric circuit including a source of potential, said electromagnet and at least one contact of said relay so that actuation of the relay closes the contact and energizes said electromagnet to move the upper electrode away from the lower electrode and draw an arc, said electric motor being controlled by an electrical control circuit which includes a balanced magnetic amplifier and a source of alternating current in series with said motor, said magnetic amplifier including a pair of saturable reactors, control windings on said saturable reactors, means for rectifying the output of the secondary of said transformer to provide a D. C. control signal for said control windings, bias windings on said saturable reactor, means for rectifying the arc current flow between said electrodes to provide a D. C. saturating signal for said biased winding, feed back rectifiers providing regenerative feed back for said amplifier, and controlled windings on said reactors connected in series with the alternating current source and the motor so that the current output of said magnetic amplifier flows through the motor to control the speed thereof and maintain a predetermined spacing between said electrodes.

14. In an arc lamp, the combination of a frame, upper and lower electrode carriages mounted for relative movement on said frame, means for supporting an electrode from each of said carriages in co-linear relationship, a first rack connected to said upper electrode carriage, a second rack connected to said lower electrode carriage, the longitudinal axes of said racks being disposed in spaced parallel relationship, a gear for engaging both of said racks to cause simultaneous movement of said racks in opposite directions, an electric motor connected to said gear, an electromagnet mounted on said first rack, a lever interconnecting the supporting means for the upper electrode and the electromagnet, a series electric circuit including a source of potential, the electrodes, said electromagnet and the primary of a transformer for energizing said electromagnet to move the upper electrode away from the lower electrode and draw an arm, said electric motor being controlled by an electrical control circuit which includes a balanced magnetic amplifier and a source of alternating current in series with said motor, said magnetic amplifier including a pair of saturable reactors, control windings on said saturable reactors, means for rectifying the output of the secondary of said transformer to provide a D. C. control signal for said control windings, bias windings on said saturable reactor, means for rectifying the arc current flow between said electrodes to provide a D. C. saturating signal for said bias windings, feed back rectifiers providing regenerative feed back for said amplifier, and controlled windings on said reactors connected in series with the alternating current source and the motor so that the current output of said magnetic amplifier flows through the motor to control the speed thereof and maintain a predetermined spacing between said electrodes.

References Cited in the file of this patent

UNITED STATES PATENTS

| | | |
|---|---|---|
| 688,649 | Kayser | Dec. 10, 1901 |
| 2,117,911 | Rutemiller | May 17, 1938 |
| 2,622,239 | Bracutt | Dec. 16, 1952 |
| 2,616,059 | Benson | Oct. 28, 1952 |
| 2,640,947 | Journeaux | June 2, 1953 |